Aug. 13, 1946.  F. J. BILEK  2,405,638
POULTRY SHACKLE
Filed Sept. 25, 1944
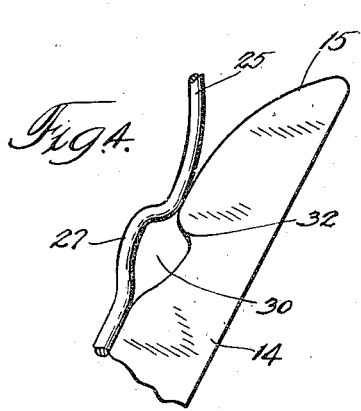
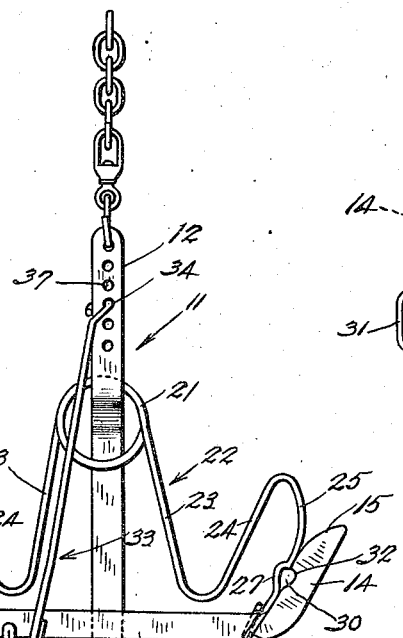
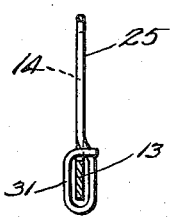
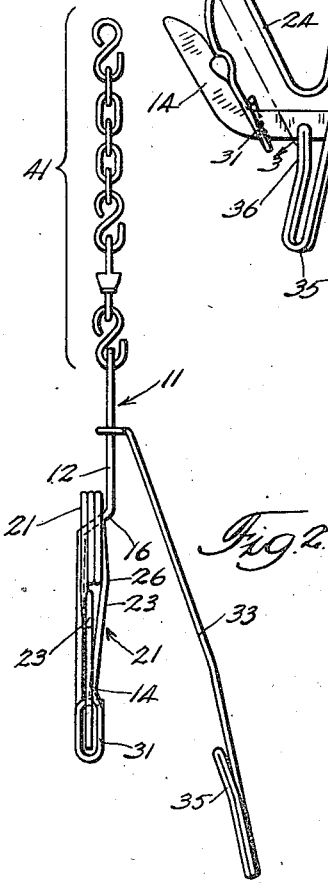
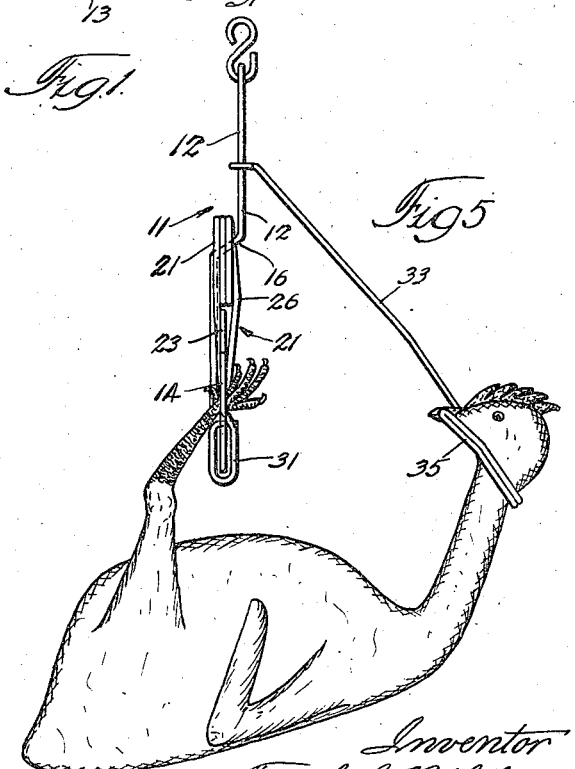
Inventor
Frank J. Bilek.
By Thiess Olson & Mecklenburger
Attys.

Patented Aug. 13, 1946

2,405,638

UNITED STATES PATENT OFFICE 2,405,638

POULTRY SHACKLE

Frank J. Bilek, Chicago, Ill., assignor to The Globe Company, Chicago, Ill., a corporation of Illinois Application September 25, 1944, Serial No. 555,668

11 Claims. (Cl. 17—44.1)

This invention relates to a shackle for suspending animals in a slaughterhouse and more particularly to a shackle of that general class particularly adapted for the suspension of poultry and fowl.

In the processing of birds for consumption as food it is most convenient, after the animal has been slaughtered, to suspend the same in a preferred convenient position, for example, by the feet and neck, so that the rear lower part of the animal is upwardly disposed for evisceration, and in that same position plucking and the usual wax dip for removal of the pin feathers may likewise be conveniently accomplished.

In prior devices intended for the purpose described, various means have been devised for suspending each animal in an individual support, a plurality of such supports being carried on a conveyor chain or rack for convenience in quantity production. However, in such prior devices it has been necessary that the feet of the bird be gathered and constricted for insertion in the gripping means, an operation both time-consuming and inconvenient. Furthermore, no means was provided for suspending the bird other than by the feet, so that its position was not an optimum one for the desired processing steps.

Accordingly, the principal object of the present invention is to provide a suspending shackle of the type described having the gripping means so arranged that the bird's legs may be rapidly engaged and disengaged, and so disposed as to spread the legs a predetermined amount for convenience in evisceration and other operations.

An additional object lies in the provision of a hook adapted to engage the neck of the bird and hence dispose it with its body substantially in a horizontal position.

A still further object is the provision of a device of the type described in which the hook aforesaid has a certain freedom of movement for adjustment to varying sizes of birds, and is arranged to prevent tangling of the hook with other shackles adjacent thereto on the same conveyor or support.

Another object is to provide in a device of the type described, gripping means comprising a unitary spring-like member cooperating with a rigid member and thereby eliminate the use of complicated moving parts which may cause difficulties in operation and maintenance.

Another aim is to provide a device of the type described which is characterized by extreme simplicity and ease of cleaning.

Other advantages will appear from the following description and the drawing in which latter:

Figure 1 is a front elevational view of the shackle with part of the supporting chain broken away for clarity;

Fig. 2 is a side elevation of the shackle;

Fig. 3 is a cross-sectional view on the line 3—3 of Fig. 1;

Fig. 4 is an enlarged partial view of the leg-engaging aperture of the shackle; and Fig. 5 is a side elevational view showing a bird suspended on the shackle.

Referring first to Fig. 1, the shackle frame indicated at 11 is substantially of inverted T-shape and comprises a shank 12 to which is fastened by spot welding or otherwise the transverse member 13 preferably symmetrical about the center line of the shank and terminating at both sides in upturned outwardly sloped tangs or flukes 14, the upper end of which is arcuate as at 15 for a purpose to be described. As seen in Fig. 3 the frame 11 is formed of a metal bar preferably of thin, flat cross-sectional area.

The shank 12 is offset flatwise at 16 in a region approximately mid-way between the top and bottom thereof so that the upper portion thereof is disposed a predetermined distance laterally with respect to the lower portion, as clearly seen in Fig. 2. The offset 16 passes through and retains, together with the upper and lower portions of the shank 12, the coiled portion 21 of the helical torsion spring member 22. The coiled portion 21 is comprised of two or three coils and the termini of the coil extend downwardly and slightly outwardly to form the pair of arms 23. The arms 23 are then curved upwardly just short of the upper edge of the transverse member 13 and then outwardly as in branches 24. These upward branches 24 extend to a position above the arcuate surfaces 15 of the flukes 14 and then arcuately substantially downwards as at 25 to a point tangential to the lower end of the curved surfaces 15. Due to the fact that the arms 23 are displaced along the axis of the coil 22, a slight lateral offset 26 sufficient to realign them substantially with the edge of the flukes 14 is provided.

The downwardly extending portions 25 of the gripping member 21 are provided with a deformed prominence 27 of shallow substantially V-shape (Fig. 4), the apex of the V being directed towards the shank 12. Following the deformation 27 the arms 25 continue farther downwardly parallel and contiguous to the inner edge of the flukes 14 and are formed into a bent loop 31 (Fig. 3). The loops 31 are adapted to embrace the transverse member 13 to be guided thereby but are provided with sufficient clearance or play for proper operation.

In the inner edge of each of the flukes 14 disposed opposite the V-shaped prominence 27 and shaped symmetrically therewith is the notch 32 (Fig. 4). It is to be noted that the prominence 27 together with the notch 32 delimits a lanciform aperture 30 particularly designed to correspond as closely as is practicable with the cross section of the leg of the bird in a zone where it is to be gripped.

For supporting the neck of the bird in the desired position there is provided an elongated member 33 preferably formed of bent wire and having a hooked portion 34 at its upper end and the U-shaped neck-engaging hook 35 at its lower end. It is to be noted that the open end of the hook 35 is given a slight outward draft 36 so that the tapered throat so provided will facilitate engagement of the neck therewith, and the wire from which the hook is formed is preferably, as shown, doubled back upon itself for at least the extent of the hook 35 to provide additional rigidity.

The upper hook 34 is adapted to be engaged with any one of a plurality of apertures 37 passing through the upper end of the shank 12.

For suspending the shackle from a conveyor trolley or other suitable support there is provided the chain and swivel hook depicted generally at 41. Since the same may take any one of several forms, and with or without a swivel, it is not intended to form part of the present invention.

From the foregoing it will be noted that to load the device it is necessary only that that portion of the legs of the bird just above the claws be inserted in the V-shaped passage formed between the members 25 and surfaces 15, and then forced downwardly against the tension of the spring member 22 until they are gripped between the V-shaped prominence 27 and notch 32 and within the aperture 30 (Fig. 4). Accidental disengagement under the force of gravity or otherwise is avoided by the generally speaking larger cross sectional area comprised of the claws as compared to the leg above the claws. The neck of the bird is engaged in the hook 35 as will be apparent from the drawing, the hook 34 having been inserted beforehand in an aperture 37 so selected as to maintain the desired position of the bird regardless of its dimensions. In this position the bird is suspended with the longer axis of its trunk in substantially a horizontal position so that killing, evisceration, plucking, removal of the pin feathers by a wax-compound dip and any other desired processing steps are greatly facilitated.

For removing the animal from the shackle it is necessary only to reverse the inserting operation since the slope of the V-shaped prominence 27 and notch 32 will permit disengagement merely by manual force against the legs.

It will be comprehended that the device disclosed is not limited in its use to birds but is applicable to other animals of light weight. Moreover, by utilizing the same principles of construction and increasing the strength of the parts, heavier animals, for example, hogs, calves, et cetera, may be suitably suspended for various operations in the abattoir.

While I have shown one embodiment of my invention, it will be understood, of course, that I do not wish to be limited thereto since many modifications may be made and I, therefore, contemplate by the appended claims to cover any such modifications as fall within the true spirit and scope of my invention.

Having thus described my invention, what I claim and desire to secure by Letters Patent is:

1. A shackle adapted to grip and support a bird for processing in a killing and dressing plant comprising in combination an inverted T-shaped frame including a shank and a head extending transversely thereto, said head terminating at both ends in upwardly disposed projections, a spring member supported on said shank and having two oppositely disposed downwardly extending fingers adapted to form with said projections a pair of means for engaging the legs of the bird.

2. A shackle adapted to grip and support a bird for processing in a killing and dressing plant comprising in combination an inverted T-shaped frame including a shank and a head extending transversely thereto, said head terminating at both ends in upwardly disposed projections, a spring member supported on said shank and having two oppositely disposed downwardly extending fingers, one individual to and juxtaposed to each said projection, each said finger including a pocket adjacent the inwardly facing surface of its said projection to receive therein and to form with said projection gripping means to engage a leg of the bird.

3. A shackle adapted to grip and support a bird for processing in a killing and dressing plant comprising in combination a frame including a portion for supporting the shackle and a horizontal member terminating at its ends in upwardly disposed projections, a resilient member supported on said frame and including a pair of fingers, the said fingers each being provided with a depression and the said projections each being provided with a depression opposite and cooperating with said first-mentioned depression, each said pair of adjacent depressions together forming a pocket for the reception and gripping of a leg of the bird.

4. A shackle adapted to grip and support a bird for processing in a killing and dressing plant comprising in combination an inverted T-shaped frame including a one-piece shank having a portion thereof offset with respect to the remainder thereof and a head section perpendicular to said shank, the extremities of said head section being formed upwardly to form projections with respect to said section and said projections having an arcuate inwardly facing portion, a resilient member retained by the offset and having two downwardly extending fingers in cooperative gripping relation with said projections.

5. A shackle adapted to grip and support a bird for processing in a killing and dressing plant comprising in combination an inverted T-shaped frame including a one-piece shank having a portion thereof offset with respect to the remainder thereof and a head section perpendicular to said shank, the extremities of said head section being formed upwardly to form projections with respect to said section and said projections having an arcuate inwardly facing portion, a resilient member retained by the offset and having two downwardly extending fingers in cooperative gripping relation with said projections, each said finger and each said projection having a depression therein, the respective depressions being so disposed as to form an aperture therebetween for engaging a leg of the bird.

6. A shackle adapted to grip and support a bird for processing in a killing and dressing plant comprising in combination a T-shaped frame including a shank having one portion thereof offset with respect to the remainder thereof, and a head portion transversely disposed with respect to said shank and having extremities angularly disposed with respect to said head portion, a resilient member including a helical portion retained between the offset portions and terminating in two tangential arms, the said arms being contiguous to said extremities and forming therewith resilient gripping means to receive and retain the legs of the bird.

7. A shackle adapted to grip and support a bird for processing in a killing and dressing plant comprising in combination a T-shaped frame including a shank and a head positioned transversely thereto, the extremities of the head being disposed angularly to said head, a helical-torsion spring member retained on the shank, the extremities of said spring member extending downwardly and outwardly and terminating in fingers adjacent to and forming with the said first mentioned extremities gripping means for engaging the legs of the bird, and said last-mentioned extremities each terminating in a loop embracing and adapted to be guided by the said head.

8. A shackle adapted to grip and support a bird for processing in a killing and dressing plant comprising in combination a T-shaped frame including a vertically disposed shank and a head positioned transversely thereto, said head terminating at each end in a projection disposed substantially vertically, a resilient member of relatively small cross section supported on said shank and having two oppositely disposed arms, each said arm being returned upon itself in order to form at least two bights therein and then continuing to form an end contiguous to a said projection and cooperating therewith for gripping a leg of the bird.

9. A shackle adapted to grip and support a bird for processing in a killing and dressing plant comprising in combination a T-shaped frame including a vertically disposed shank and a head positioned transversely thereto, said head terminating at each end in a projection disposed substantially vertically, a resilient member of relatively small cross section supported on said shank and having two oppositely disposed arms, each said arm being returned upon itself in order to form at least two bights therein and then continuing to form an end contiguous to a said projection and cooperating therewith for gripping a leg of the bird, and said end continuing beyond the contiguity into a loop formation, the aperture of said loop freely embracing the said head.

10. A shackle adapted to grip and support a bird for processing in a killing and dressing plant comprising in combination a T-shaped frame including a vertically disposed shank and a head positioned transversely thereto, and said head terminating at each end in a projection disposed substantially vertically, a resilient member of relatively small cross section and supported on said shank and having two oppositely disposed arms, each said arm being returned upon itself in order to form at least two bights therein and then continuing to form an end contiguous to a said projection and cooperating therewith for gripping a leg of the bird, the region of contiguity of the said arm being deformed into a substantially semi-lanciform prominence, and the corresponding region of the projection being provided with a substantially semi-lanciform notch together forming an aperture to receive a leg of the bird and to grip the same.

11. A shackle adapted to grip and support a bird for processing in a killing and dressing plant comprising in combination a T-shaped frame including a vertical shank and a horizontal head affixed thereto, the head terminating at each end in an outwardly directed projection angularly disposed with respect to the said head, each said projection having an arcuate contour on its inwardly disposed face, and a resilient member supported freely on said shank, said member having a helically coiled portion continuing into a pair of substantially downwardly directed arms tangential thereto, each said arm being individual to one of said projections, and each said arm being deformed to form at least two bights therein and then continuing into an arcuate portion convex outwardly and forming a throat with said first mentioned arcuate contour, said arcuate portion then continuing into a substantially V-shaped prominence, and each said projection being provided with a substantially V-shaped notch opposite said prominence and forming therewith an aperture, whereby a leg of the bird may be inserted in a said throat, thrust downwardly against the tension of said resilient member into said aperture and then gripped between said prominence and notch.

FRANK J. BILEK.